July 8, 1958 H. W. BROWN 2,842,660

BASE-BAFFLE SOCKET ASSEMBLY

Filed May 25, 1954

2 Sheets-Sheet 1

INVENTOR.
HARRY W. BROWN

BY

H.F. Ross
ATTORNEYS

BASE-BAFFLE SOCKET ASSEMBLY

Filed May 25, 1954

2 Sheets-Sheet 2

INVENTOR.
HARRY W. BROWN

BY

H F Rosa

ATTORNEYS

United States Patent Office 2,842,660

Patented July 8, 1958

2,842,660

BASE-BAFFLE SOCKET ASSEMBLY

Harry W. Brown, Mechanicsville, Pa.

Application May 25, 1954, Serial No. 432,337

2 Claims. (Cl. 250—16)

Figures 1, 4:
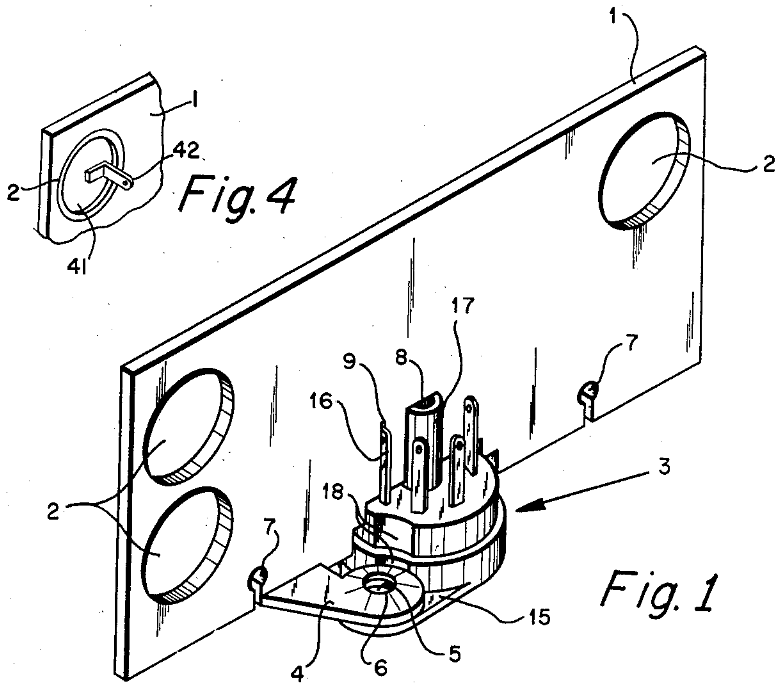

(Granted under Title 35, U. S. Code (1952), sec. 266)

The invention described herein may be manufactured and used by or for the Government of the United States of America for governmental purposes without the payment of any royalties thereon or therefor.

The invention relates to an improved base-baffle socket assembly and more particularly relates to the provision of a plurality of baffle members adapted to be fit over conventional existing tube sockets and wherein compartmentalization of the electronic equipment may be achieved together with maximum isolation between stages as well as maximum isolation between grid and anode components of each single stage.

Disadvantages of prior art devices have been that compartmentation in previous forms has not provided improvement in any receiver design parameters other than isolation of ground currents. Prior art devices also presented difficulty of component installation which restricted use of the design to a minimum depending on performance requirements. In addition prior art installations required solution of complicated problems in the installation of stage components. A further disadvantage lay in the fact that space requirements between baffle stages of previously known devices was relatively large rendering it impossible to build compact units. In addition, prior art devices were restricted to in-line configurations.

The invention described herein overcomes these and other disadvantages and in addition provides further advantages in that the baffle plate can be stamped ready for the installation of components in one operation and all components may be attached to the base-baffle and socket prior to installation in the receiver or other electronic unit compartment; this permits a great saving in production assembly time, each base baffle-stage may be identical with the next stage permitting extremely close tolerance of interstage capacity and in the inductance of lead length, replacement baffle stages can be quickly changed for maintenance, and the method of by-passing and decoupling inasmuch as it is an integral part of the base-baffle assembly assures complete receiver stability.

Accordingly, a purpose of the inventive device is to present a baffle for grounding radio frequency currents.

Another aim of the invention is to present a baffle which will permit isolation between stages and prevent regenerative feedback.

Another important aim of the invention is to permit isolation between stages and simultaneously prevent feedback by presenting a plate which is not a part of the circuitry of the electronic device into which it is to be installed.

Still another purpose of the inventive device is to present a tube-straddling baffle centrally disposed so as to present an effective barrier against feedback to provide an isolating function.

Another aim of the invention is to provide a baffle which will be very highly effective for shielding between several stages and in shielding each stage from the others.

Still another object of the instant invention is to provide a baffle which will improve receiver performance and will provide an effiecient method of functioning for intermediate amplifiers and which will readily lend itself to production facilities.

Another aim of the present invention is to provide a base-baffle which will be relatively simple to assemble with an electronic unit and in which will be provided unusual stability of the amplifier of an electronic unit.

Still another object of the invention is to provide improved base-baffle design wherein intermediate frequency amplifier stability at high frequencies is excellent and in which a technician inexperienced in receiver construction can complete a perfect amplifier utilizing complex circuitry in a relatively short time while assembling the device of this invention.

Another object of the invention is to provide a fixed design base-baffle establishing a standard for the construction of amplifiers in which complete stability of operation and suitability for any configuration requirement reside and which will facilitate production and be easily and quickly replaced in the event of component failure and which will readily be removable from a socket together with all associated components.

Another object of the invention is to provide compartmentation in receiver design wherein a socket with a baffle attached to the chassis will isolate the grid components from the plate components as well as providing isolation and preventing feedback between or among stages of an electronic device.

Another aim of the invention is to provide baffle stages wherein the space requirement between the stages is limited only by tube socket diameters thereby affording minimum space requirement and wherein use of the baffle is not restricted to in-line configuration and wherein facility of inter-connection of the stages after assembly of the base-baffle unit is present.

Another object of the invention is to provide a baffle plate which can be readily stamped for the installation of components in one operation and wherein all components may be attached to the base-baffle and socket previous to installation in a receiver or other electronic apparatus compartment thereby permitting a great saving in production assembly time and wherein each base-baffle stage may be made identical to the next permitting extremely close tolerance of interstage capacity and inductance of lead length and further wherein replacement baffle stages can be quickly changed for maintenance reasons.

Figure 2:
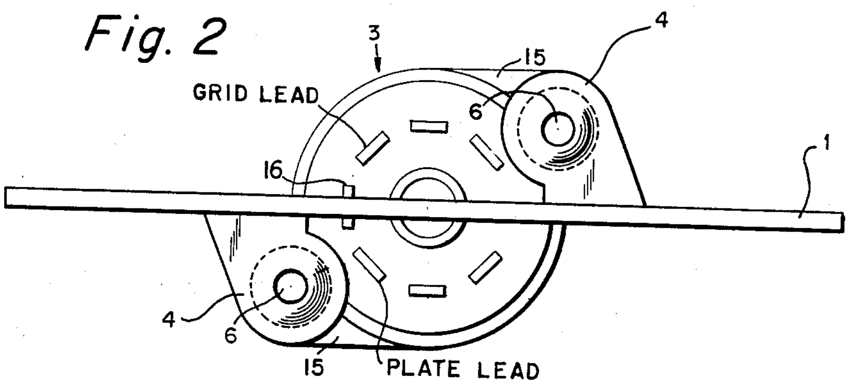
Figure 3:
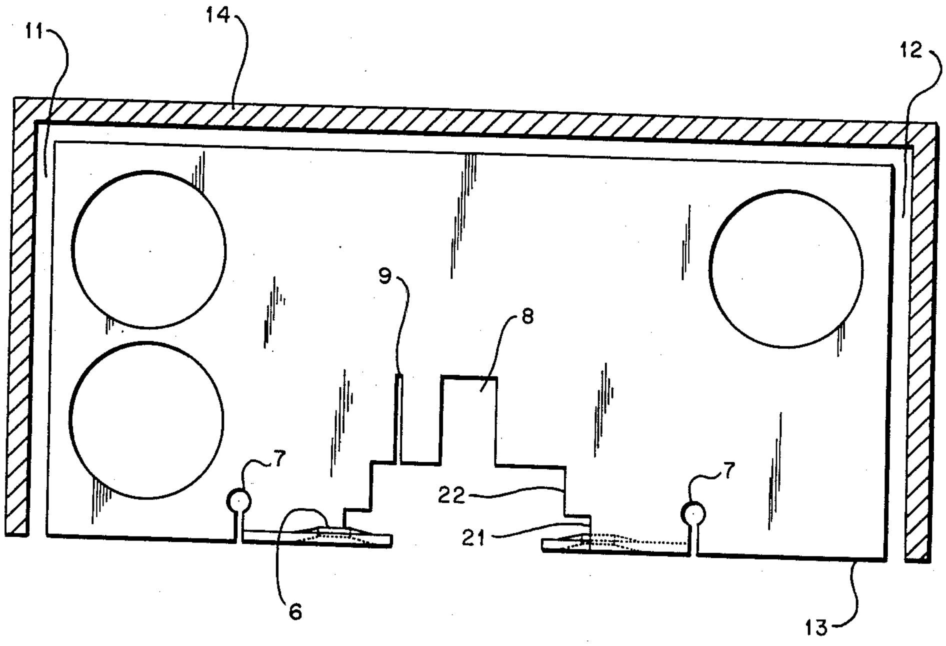

Other objects and many of the attendant advantages of this invention will be readily appreciated as the same becomes better understood by reference to the following detailed description when considered in connection with the accompanying drawings wherein:

Fig. 1 is an isometric view of a tube socket with an illustrative embodiment of the base-baffle of the invention in assembled relationship therewith and showing apertures stamped through the base-baffle for interconnection of tube elements, Fig. 2 presents a top view of the illustrative embodiment of the inventive baffle, Fig. 3 is a plan view of the illustrative embodiment of the base-baffle of the invention and showing a conventional electronic apparatus chassis in relation to the baffle and illustrating that the baffle does not touch on any of three sides of the chassis, the chassis being shown in cross-section for purposes of illustration, and Fig. 4 shows a detail of Fig. 1 complete with a series decoupling decapacitor.

Referring to the drawings a generally rectangular metal plate member 1 which may be of brass material has a pair of angularly disposed lugs 4 bent perpendicularly outward from the rectangular plate 1. Lugs 4 contain apertures 6 disposed therein. The lugs are bent and the apertures so disposed therein so as to fit into mating relationship with apertures in the protruding chassis attachment lugs 5 of a conventional tube socket 3. Thereby, by aligning the lugs 4 and containing aperture 6 of the baffle plate member with the apertures in lugs 5 of the conventional tube socket 3, common fastening members as for example, screw members (not shown) may be used to connect both baffle member 1 and tube socket 3 to the chassis by a common fastening device. In addition, this configuration permits of the baffle being positively located with respect to predetermined individual tube socket prongs so as to avoid possible error in installation and to insure dependability of circuit assembly. Lugs 4 may be made integral with the plate 1 or they may be separate members appended thereto in conventional ways.

A plurality of apertures 2 may be stamped out, bored, drilled or otherwise disposed in the longitudinal plate member 1 for a purpose to be described. Plate member 1 is made of dimensions such that the side and top edges of the plate member are spaced on three edges closely adjacent to but not in contact with the chassis of the electronic apparatus into which it is to be incorporated as best shown in Fig. 3 of the drawings. This is done in order to make the baffle more effective in its isolating function. Connection except completely around the baffle edges would render the inventive device less effective or ineffective for stage isolation purposes.

A pair of key shaped slots 7 are machined or otherwise struck out from the underside of the generally rectangular plate member 1 to provide for fatigue failure and prevent cracking when the lugs 4 are struck out or fabricated. These slots 7 may be sealed at assembly either after use for connection of elements through the slots 7 or without such use by soldering up the space or in other known ways.

Rectangular plate member 1 is machined to fit the contour of a socket base 3. To this end a large rectangular portion 21 and a somewhat smaller portion 22 are machined or otherwise struck out of the central portion of the lower edge of the plate member 1 to fit over corresponding contours of the socket member 3. Where mounting permits, these may be of dimensions to fit over grooves 18 of a conventional socket member. An elongated rectangular portion 18 is machined or struck from the central portion of the plate member 1 just above the cut-out portion 22 machined to fit over the base of the tube socket 3. Elongated rectangular member 8 is of dimensions to closely fit over the metal center post of tube socket 3. An elongated slit 9 is machined of dimensions to fit over a grounding pin 16 of the tube socket 3 and appropriately spaced therefor from the rectangular portion 8. Apertures 2 hereinbefore described may be punched or otherwise machined to accommodate go-through button capacitors for series decoupling, as shown, for example, in Fig. 4 and described further below. The angular tabs or lugs 4 as hereinbefore stated are provided with drilled, extruded or otherwise machined apertures 6 to coincide with the socket mounting holes and may be tapped if desired.

In assembly, the baffle 1 may be soldered to the metal center post 17 of the socket 3 to provide electrical ground and add strength to the baffle support. The components may be assembled directly on the socket contacts and the go-through capacitors 41 having through-lead connections 42, as illustrated in Figure 4, separated from the baffle plates 1. Ground connections may be made to the lugs 15 on the socket 3. The socket complete with base-baffle and all components may be attached to the chassis deck by means of two screws (not shown) inserted through the socket mounting holes and secured in the baffle lugs 15. Thereby this type of base-baffle will greatly simplify installation of stage components since all parts are attached before installation of the baffle. Installation of the lower edge of the baffle plate 1 may be made on the chassis deck of the receiver or other electronic equipment, the space requirement between the baffle stages being limited only by the socket diameters; this affords a minimum space requirement. The use of this type baffle is not restricted to in-line configuration. Any angular or curved contour is suitable for the base-baffle compartment. Interconnection of the stages after assembly of the base-baffle units thereby may consist of only three soldered connections.

Although the following dimensions are in no wise to be construed as limiting, they are illustrative of one type of baffle plate of the instant invention which has proved very satisfactory in operation and in test. The dimensions used in this baffle plate were length of plate, 2 inches, altitude or width of plate 15/16 inch, distance from the base to the top of longitudinal cut-out portion 8, 9/16 inch, distance from the base of the plate to the lowermost portion of longitudinal cut-out portion 8, 9/32 inch, distance from the base of the plate to the top of cut-out portion 21, 7/64 inch, distance between the slot 7, 1 3/16 inches, length of cut-out portion 21, 3/4 inch, length of cut-out portion 22, 5/8 inch, diameter of rounded portion of 7, .046 inch, width of slit portion of the slot 7, 1/64 inch, distance between the center of elongated slot 8 and the center of slit 9, 1/4 inch, width of cut-out portion 8, 3/16 inch, width of slit member 9, 1/64 inch, angular relationship of the outer edge of tab 4 with respect to the base, 112°, distance of aperture center of aperture 6 from the base, .151 inch, radius of outer edge of tabs 4, 1/8 inch radius, distance between the centers of apertures 6 measured parallel to the plate member 1, .808 inch, diameter of apertures 2, 3/8 inch, distance from base to the center of the lowermost aperture 2, 1/4 inch, distance between centers of apertures 2 shown to the left of figure 15/32 inch, diameter of apertures 6, .098 inch diameter, pierced or extruded aperture in the direction shown on the drawings or No. 4 self tapping metal screw, thickness of plate, .032 inch. It is to be noted that these dimensions are by way of illustration of one successful model used and are to be construed as in no wise limiting in any sense. The above plate was used in an electronic equipment chassis with a base member for mounting sockets which was 2 1/4 inches wide, and which had a cover member 14, 2 5/32 inches wide and of height dimension such that no contact was made between the upper edge of plate member 1 and the chassis cover top 14. It is desirable that closing cover member 14 should not contact the base-baffle partitions; and a space clearance of approximately 1/8 inch as shown at 11 and 12 has proved sufficient in operation.

There is thereby provided apparatus permitting utilizing a base-baffle in the design of high gain, high frequency amplifiers and which will serve as a means to simplify mounting of components and other applications in which a fixed design may be provided establishing a standard for the construction of amplifiers with complete stability of operation and suitable for any configuration requirement, thereby facilitating production and providing for quick and easy replacement of an entire stage of amplification or a socket together with all associated components in the event of component failure and whereby compartmentalization as well as isolation of grid components from plate components and isolation between stages is effected. The baffle plate can be stamped ready for the installation of components in one operation, or components may be attached to the base-baffle and socket previous to installation in the receiver compartment thereby permitting a saving in production assembly time and each base-baffle stage may be identical with the next thereby permitting extremely close tolerance of interstage capacity and the inductance of lead length. The structure provided also permits of a method of by-passing and decoupling as an integral part of the base-baffle assembly to assure complete receiver stability. Features of note which should be emphasized are that the base-baffle plate is attached only to the socket, the holes for mounting the socket and the main chassis provide the mounting for the entire base-baffle assembly, the arrangement of capacitors in the baffle plate assures adequate filtering in stage isolation and all components may be assembled on the socket base-baffle before installation on the chassis deck.

It should be noted that the structure of the base-baffle shown permits of attachment to the socket during manufacture, as an integral part ready for component assembly.

Obviously many modifications and variations of the present invention are possible in the light of the above teachings. It is therefore to be understood that within the scope of the appended claims the invention may be practiced otherwise than as specifically described.

What is claimed is:

1. In electronic apparatus comprising a chassis and a tube socket having a grounding post and lugs with apertures therethrough for attaching the socket to the chassis, a base-baffle comprising a plate of conductive material, said plate having depending tabs with apertures aligned with the apertures in said tube socket lugs, connecting means to attach said lugs and said baffle tabs to said chassis, one edge of said baffle plate being shaped to fit over the tube socket and socket post, a slot in said plate disposed to fit over a grounded prong of said tube socket, said plate being disposed perpendicular to the chassis and straddling said tube socket, and means in said plate for providing series decoupling therethrough.

2. A baffle plate member for an electronic tube socket, said baffle plate member having an upper edge, a lower edge and two side edges, said baffle plate having a first centrally disposed elongated generally rectangular cut-out portion of size and shape to fit a large dimension of said tube socket, said baffle plate having a second rectangular cut-out portion slightly smaller than said first cut-out portion and disposed adjacent said first cut-out portion, a slit member disposed perpendicularly to the longitudinal dimension of said second cut-out portion and of size and shape to closely conform to the contours of a tube socket grounding pin, a second elongated cut-out slot disposed adjacent to said second cut-out portion and centrally disposed thereto and of size and shape to conform to the metal center post of said tube socket, a pair of tab members extending perpendicularly to and in angular relationship to a face of said baffle plate and having apertures therein positioned so as to fit in aligned position with apertures in the lugs of the tube socket, the tube socket being designed to be connected to a chassis of an electronic apparatus, thereby positioning the baffle plate in straddling relationship to said tube socket and insuring that the only pin of said tube socket which will contact the baffle plate member is the grounding pin, and means in said baffle plate member for permitting series decoupling therethrough.

References Cited in the file of this patent

UNITED STATES PATENTS

| | | |
|---|---|---|
| 2,512,138 | Butt | June 20, 1950 |
| 2,574,978 | Mensch | Nov. 13, 1951 |
| 2,677,769 | Fathauer | May 4, 1954 |
| 2,706,798 | Kodama | Apr. 19, 1955 |

UNITED STATES PATENT OFFICE

CERTIFICATE OF CORRECTION

Patent No. 2,842,660

July 8, 1958

Harry W. Brown

It is hereby certified that error appears in the printed specification of the above numbered patent requiring correction and that the said Letters Patent should read as corrected below.

Column 1, line 47, for "base baffle-stage" read -- base-baffle stage --; column 3, between lines 16 and 17, insert the following paragraph:

-- Figure 2 also shows the arrangement of lugs 4 and 5 of the baffle 1 and socket 3, respectively, and the manner in which the grid and plate leads of the vacuum tube are separated by the baffle to effect isolation between stages. --;

column 3, line 3, for "lugs 5" read -- lugs 15 --; line 5, for "apertures in lugs 5" read -- apertures 5 in lugs 15 --; line 45, for "portion 18" read -- portion 8 --; line 49, for "member 8" read -- portion 8 --; line 72, for "lugs 15" read -- lugs 4 --.

Signed and sealed this 4th day of November 1958.

(SEAL)
Attest:

KARL H. AXLINE
Attesting Officer

ROBERT C. WATSON
Commissioner of Patents